106-90

EXAMINER

Patented June 20, 1950

2,512,067

UNITED STATES PATENT OFFICE 2,512,067

PORTLAND CEMENT COMPOSITION AND METHOD OF MAKING

Hooper Linford, Manhattan Beach, Calif., assignor to Union Oil Company of California, Los Angeles, Calif., a corporation of California No Drawing. Application October 15, 1946, Serial No. 703,283

11 Claims. (Cl. 106—90)

1

This invention relates to a new grinding aid and plasticizer to be used in Portland cement production and is a continuation-in-part of my copending application, Serial No. 601,713, filed June 26, 1945, now abandoned.

Portland cement has been referred to as largely a mixture of finely ground, synthetic, highly basic lime silicates with which are present lesser amounts of the highly basic lime aluminates, lime alumino ferrates, and solid solutions of these with the many metallic oxides found in clays, limestones and the other raw materials used in cement. In brief the major constituents of the cement may be considered to be tricalcium silicate, dicalcium silicate, tricalcium aluminate and tricalcium alumino ferrate which constituents vary in their proportions depending upon the type of cement to be produced.

Limestone and clay are the necessary raw materials for the production of the cement. The limestone is reduced to egg size by a crusher and is dried in a rotary furnace and subsequently crushed still further and pulverized to such a fineness that approximately 90% will pass through a 100 mesh screen. This powdered limestone is mixed with the necessary materials to result in the desired final composition and is fed into a rotary kiln either in brick form or as a slurry wherein three distinct changes occur in an equal number of sections of the rotary kiln. In the initial section of the furnace where the materials are warmed to red heat any remaining water is driven therefrom. In the central zone where the temperatures may average 1000° C. the carbon dioxide is expelled from the limestone and in the last, or zone of maximum heat, where a temperature as high as 1420° C. may be reached the mass partly fuses by incipient fusion to form small clinkers like gravel. After cooling, the clinkers are disintegrated and pulverized in the presence of a small amount of gypsum to yield the final dry cement powder. Generally around 3.0% of gypsum is employed, however, the amount of gypsum to be used depends upon the desired rate of setting of the resultant Portland cement. Fast setting cements will generally contain less than 3.0% of gypsum, such as amounts ranging from 0.5% to 1.5% or 2.0% and slow setting cements will generally contain 3.0% of gypsum or more, such as around 4% or 5%.

It is one object of this invention to furnish a group of materials which aid materially in the grinding of this mixture of clinker and gypsum to produce the finished cement powder.

For many years in the cement industry the use of admixtures in Portland cement for the purpose of improving any somewhat lacking quality was definitely frowned upon. More recently, however, a definite reversal of the former reluctance has occurred and active research is being carried out on such problems as grinding aids, plasticizers, water repellants and the like.

Grinding aids are becoming increasingly important in the manufacture of Portland cement because of their ability to improve materially the efficiency of clinker grinding. It is the growing importance of the high early-strength Portland cement which has stimulated this increased interest in grinding aids. Briefly, grinding aids are defined as substances which when added in small amounts will assist materially in the grinding. This grinding aid action is manifested either as an increase in cement fineness when grinding for a given time or as a reduction in grinding time when grinding to a definite fineness. In terms of commercial operation this would mean increased fineness at the same feed rate or increased output at constant fineness.

Many cement plants using open-circuit grinding are unable to make high early-strength cement because of the high power costs when they try to grind to extreme fineness. This inefficiency is ascribed to the excessive coating which develops on the grinding balls during the operation. Further, the cost of air separation equipment for closed-circuit operation is also high. In these instances the use of grinding aids has proved helpful in attaining the desired fineness and reducing the cost of manufacturing.

Another important field open to the use of additives is that of plasticizing agents to be employed in the actual application of the cement. To prepare a satisfactory stucco or masonry cement mortar it is necessary to include in the mixture a plasticizing agent, so that the mortar may be easily applied to the surface to be stuccoed, since otherwise a quantity of water must be used which will make the stucco of too thin a consistency and running will result. Lime, of course, is a widely used and inexpensive plasticizer, but when the mortar is used on exterior surfaces the lime leaches out over a period of time resulting in plastering of inferior quality and stains are produced making an unsightly appearance.

It is another object of my invention to provide a group of compounds for use in the preparation of mortars from Portland cement which have the property of acting as plasticizers in the mortar.

It is a further object of my invention to provide a group of compounds which may be employed both as grinding aids and plasticizing agents, being effective in the first case as a grinding agent and remaining in the cement produced to act as plasticizing agents in the mortar made therefrom.

Other objects and advantages of my invention will become apparent to those skilled in the art as the description thereof proceeds.

I have found that the naphthenic acids as obtained either from petroleum hydrocarbon fractions or hydrocarbon fractions from other sources as a natural by-product therefrom are excellent grinding aids for use in the grinding of Portland cement clinkers and gypsum when employed in very small quantities. Further, I have found that the presence of these naphthenic acids or salts which may be formed therefrom within the cement serve as excellent plasticizing agents in mortar which is made from the cement.

The term "naphthenic acids" as used herein is intended to be generic and not limited to any particular kind of naphthenic acids derived from any particular crude oil or any specific methods of isolation therefrom.

Naphthenic acids are generally considered to be monocarboxylic acids containing at least one cycloparaffin ring. However, the term as used herein is meant to include all of the naturally occurring carboxylic acids found in petroleum. This broad interpretation is employed in order to include the lower molecular weight "naphthenic acids" which are thought by some investigators to be saturated open branched chain carboxylic acids.

In the conventional method of recovery of naphthenic acids from petroleum or other fractions the fraction is washed with aqueous alkali metal hydroxide or carbonate, preferably sodium hydroxide or sodium carbonate, solution to extract the naphthenic acids in the form of their alkali metal soaps. These soaps are preferentially soluble in the aqueous phase and are separated from the extracted oil by decantation. The crude naphthenic acids may be obtained from these caustic extracts by acidification with mineral acids such as sulfuric acid, hydrochloric acid and the like. Generally crude naphthenic acids recovered in this manner will contain between about 10% and about 30% by weight or more of hydrocarbon oil and other impurities depending upon the molecular weight of the hydrocarbon fraction extracted and upon conditions of the extraction such as strength of the caustic or carbonate solution, temperature and the like. The presence of hydrocarbon oil in the crude acids results from the fact that aqueous alkali metal naphthenate solutions have the ability to hold rather large proportions of oil in pseudo solution. Thus a caustic extract containing 10% to 15% by weight of sodium naphthenate may contain between about 1% and about 4% or more of hydrocarbon oil. That the oil is firmly held by the soap in a condition approaching "solution" is indicated by the fact that these soap solutions are clear and remain clear, i. e., do not separate an oily phase even upon dilution with large volumes of water. This ability of the alkali metal naphthenates to "solubilize" oil has been thought to be due to the retention of oil particles within the micelles of the soap. Further evidence of the powerful solubilizing effect of the naphthenate soaps for hydrocarbon molecules is indicated by the fact that extraction of the aqueous caustic extracts with light petroleum solvents such as naphtha and the like does not effect the removal of more than a small part of the oil.

I have found that the presence of the impurities normally occurring in crude naphthenic acids have substantially no deleterious effect on the properties of these naphthenic acids as grinding aids or plasticizers. These impurities which are oftentimes associated with the naphthenic acids and which impair their value for certain usages but not for the usage according to my invention are unsaponifiable materials such as high molecular weight hydrocarbon oils, asphalt-like substances such as bitumens, asphalt, resins, wax and wax-like bodies and various other hydrocarbon contaminants as well as high molecular weight fatty acids and hydroxy acids. It is obvious that all of these impurities are not necessarily present in all naphthenic acids. However, in general hydrocarbon impurities are present in a substantial quantity. In any event no matter which one, or ones, of the particular impurities are present they will not unfavorably influence the desirability of the naphthenic acids for usage according to the present invention. These acids are employed in such small percentages as grinding aids or plasticizers that the presence of from 20% to 30% or more of such materials as hydrocarbon oils or other impurities will have substantially no effect on the cement or mortar produced therefrom. However, it may be desired to employ only the refined naphthenic acids in the cement production and use and if this be the case any method known for this refining may be employed.

Although extraction of the caustic extracts with light hydrocarbon solvents is not particularly efficient in removing impurities, such processes have been employed alone and in connection with other refining steps in the production of naphthenic acids. Solvents other than petroleum solvents such as alcohols and the like have also been employed, however, by such means alone it has not been possible to obtain a naphthenic acid free of hydrocarbon oil. Other methods which have been employed for the removal of the impurities described include steam distillation of the caustic extract to vaporize the hydrocarbon oil leaving an aqueous solution of soaps as a residue.

Another method of purification of the naphthenic acids comprises the decomposition of the soaps with a mineral acid to yield a water-soluble alkali metal salt such as sodium sulphate, sodium chloride or the like depending upon the mineral acid employed and the free naphthenic acids containing the above-mentioned impurities. These crude naphthenic acids are subsequently treated by extraction with a suitable solvent to effect the separation of the impurities from the acids. Solvents for this extraction are not particularly efficient and, moreover, a great deal of difficulty is generally encountered in this method of treatment due to the formation of comparatively stable emulsions in the various stages of the process. Thus in the cracking-out of the alkali soap with the mineral acid thorough agitation is necessary which often gives rise to very stable emulsions. Similarly, the residual water remaining in the acid during subsequent stages of the treatment gives rise throughout to emulsion difficulties.

Other refining processes have included the steps of acidification of the caustic extracts, dilution of the crude acids thus obtained with light petroleum solvent, extraction of the diluted solution with caustic, separation of the aqueous soap solution, acidification of the soap solution to release the naphthenic acids and distillation of the released naphthenic acids. This process although apparently desirable in that it furnishes a deoiling step has not been commercially feasible because of the formation of extremely stable jelly-like emulsions in the step of extracting the diluted crude naphthenic acid solution with caustic solution. Emulsions obtained in this manner have not been successfully broken with the various de-emulsification agents available for such purposes and in fact the emulsions have been observed to remain stable over periods of several weeks.

Perhaps the preferred method of refining these naphthenic acids comprises the cracking of the naphthenate soaps normally resulting from the treatment of naphthenic acid-containing fraction with a caustic solution by treatment of these soaps with the mineral acid such as sulfuric acid, hydrochloric acid or the like to yield the naphthenic acid fraction followed by the purification of these free acids under conditions of comparatively high temperatures and pressures which I have found has the effect of preventing the formation of emulsions during the course of purification.

Operating under conditions of elevated temperatures and pressures the acid fraction may be purified in a variety of ways such as by simple water washing or by hydrocarbon dilution followed by subsequent resaponification and splitting out of the acid or the like. It is to be understood, however, that the method of purification of the naphthenic acids is immaterial to the present invention and further that it is not necessary for the satisfactory utilization of these acids as herein described to effect their purification beyond the point of recovery of the crude acids from the hydrocarbon fractions in which they are contained as naturally occurring acids.

The naphthenic acids are in every case oil-soluble and as such are to be distinguished from the other acids present in minute amounts in hydrocarbon fractions and in somewhat larger amounts in oxidized hydrocarbon fractions which are oil-insoluble. These oil-insoluble acids are thought to be predominantly hydroxy acids and although they have been employed in the prior art as plasticizers I have found that the oil-soluble acids, that is, the naphthenic acids are superior to these oil-insoluble, presumably hydroxy, acids not only as plasticizers but as grinding aids in the production of the cement.

It has been postulated that the action in the cement itself of the naphthenic acids is to form a calcium salt of the acid which is the effective agent in improving the grinding and plasticizing properties of the cement. This postulation is entirely in the realm of theory and although it is not intended to define the scope of our invention in any manner it has been substantiated to a certain extent by the fact that I have found that the calcium salts of the naphthenic acids when used in the cement in place of the naphthenic acids themselves have substantially the same qualities of improving the grinding properties of the cement and the plasticizing property of the mortar made therefrom as the acids. Further than this other metal salts of the naphthenic acids such as sodium, magnesium, aluminum and the like are effective grinding aids and plasticizers and for this reason I do not intend to be limited in the present invention to the use of naphthenic acids only as grinding or plasticizing agents, but wish to include also the various metal salts of the naphthenic acids and particularly the alkali and alkaline earth metal salts such as not only calcium naphthenate but sodium naphthenate, potassium naphthenate, barium naphthenate, magnesium naphthenate, and the like, as well.

The quantities of these naphthenic acids or metal salts thereof which need be employed in the cement to perform the desired function effectively are extremely small. I have found that as little as 0.01% of a naphthenic acid, based on the gypsum plus the cement clinker, results not only in improved grinding but also in improved plasticizing characteristics of resultant mortar. Even less than this amount may be employed such as about 0.005% or less, or more than this amount such as about 0.5% or greater. In certain cases it may be desirable to employ larger quantities of the naphthenic acids or the metal salts of the naphthenic acids such as about 0.5% to about 1% or 2% either as a grinding aid or as a plasticizer. For economical reasons it is desirable not to employ an excessive quantity of the grinding agent or plasticizer and for this reason I prefer to use from about 0.01% to about 0.3% of the naphthenic acids or of the metal salts of the naphthenic acids, but I may employ amounts up to 1.0% or higher without departing from the principle of my invention.

Although improvement in the grinding operation is obtained by adding the described aids to the mixture of gypsum and cement clinker during the grinding operation or prior to the grinding, I have found that these grinding aids are particularly effective if they are first mixed with the gypsum before the gypsum is placed in the grinder along with the clinker. It is believed that this improvement results from the fact that the grinding aid is held on the surface of the non-porous crystalline gypsum where it is readily available to perform its function during the grinding. If the grinding aid is added directly to the clinker, or to the mixture of clinker and gypsum during the grinding operation, it is believed that, because of the porous nature of the clinker, appreciable proportions of the grinding aid are absorbed into the clinker so that it is not immediately available to perform its function during the grinding operation. Under any circumstances and regardless of the theory here presented it has been found that far smaller amounts of grinding aid are effective in producing the desired improvement in grinding when the aid is first distributed on the gypsum crystals before the gypsum is mixed with the pulverized clinker.

In adding the grinding aid to the gypsum it is desirable that the aid be distributed through the entire mass in order to obtain its most effective action in the subsequent grinding operation. The addition may be effected by any process well known in the art. Thus the grinding aid, if in liquid form, may be sprayed on the gypsum as the gypsum is being fed to the grinder or the liquid or solid grinding aid may be added to the gypsum and mixed therewith using any form or type of mechanical or other mixing device prior to feeding the treated gypsum to the grinder.

One method of determining the quality of Portland cement has been the measurement of the fineness of the ground cement represented by the specific surface expressed as total surface area in square centimeters per gram of cement. The conventional method for determining this specific surface is by means of the Wagner turbidimeter which consists essentially of a source of light of constant intensity adjusted so that apparently parallel rays of light pass through a kerosene suspension of the cement to be treated and impinge upon the sensitized plate of a photoelectric cell. The current generated by the cell is measured by a microammeter and the indicated reading is a measure of the turbidity of the suspension. General considerations indicate that this turbidity is in turn a measure of the surface area of the suspended cement. This method together with the apparatus required and the methods of calculation is fully described in the American Society for Testing Materials designation C-115-41-T and appears in the American Society for Testing Materials Standards, 1941 supplement, part II, page 257.

Employing this test method a series of grinds were made on various samples of a typical Portland cement clinker both in the absence of a grinding aid and in the presence of naphthenic acid and other grinding aids. A clinker ground with no plasticizer or grinding aid had a specific surface of 2509. The regular commercial product employing a commercial grinding aid had a specific surface after a grinding of the same duration of 2814; whereas, clinker ground with only 0.1% of naphthenic acid had a specific surface of 2717 and the clinker ground with 0.2% of naphthenic acids had a specific surface of 2895. Clinkers ground with 0.1% of oil-insoluble acids produced from the oxidation of a petroleum kerosene fraction and separated from the naphthenic acids also produced in the oxidation had a specific surface of only 2538 as compared to 2717 for the same amount of a naphthenic acid grinding aid.

Further mortars comprising one part of cement with four parts plasticizer-sand were prepared and several experienced men evaluated their plastic characteristics. The regular commercial plastic cement and the sample containing only 0.1% of refined naphthenic acid were judged to be equivalent. The samples containing the oil-insoluble acids or no grinding aid were judged to be definitely inferior. Subsequently a sample was prepared in which regular cement clinkers were ground with 0.2% of naphthenic acid, the resultant material, as described above, had a specific surface of 2895 and the corresponding mortar was selected by everyone as having the best plastic characteristics of any of the samples tested including the regular commercial plastic cement.

Having described and illustrated my invention, which comprises essentially the use of naphthenic acids, which may occur naturally in various hydrocarbon fractions or a metal salt of such naphthenic acids and preferably an alkali or alkaline earth metal salt as grinding aids and plasticizers in the production and use of Portland cement, I am aware that many modifications of the invention may occur to those skilled in the art without departing from the spirit or scope of the following claims.

I claim:

1. A method of grinding Portland cement which comprises grinding the cement clinker in admixture with between about 0.5% and about 5.0% of gypsum which gypsum has been treated with between about 0.005% and about 2.0%, based on the total grinding charge, of a compound selected from the class of compounds consisting of naturally occurring naphthenic acid and metal salts of naturally occurring naphthenic acid.

2. A method according to claim 1 in which said compound is naturally occurring naphthenic acid.

3. A method according to claim 1 in which said compound is a metal salt of naturally occurring naphthenic acid.

4. A method of grinding Portland cement which comprises grinding cement clinker in admixture with about 0.5% to about 5.0% of gypsum, said gypsum being first admixed with 0.005% to 1.0%, based on the total cement composition, of a grinding aid selected from the class consisting of naturally occurring naphthenic acid and metal salts of naturally occurring naphthenic acid.

5. A method according to claim 4 in which said grinding aid is naturally occurring naphthenic acid.

6. A method according to claim 4 in which said grinding aid is a metal salt of naturally occurring naphthenic acid, said metal being selected from the class consisting of the alkali and the alkaline earth metals.

7. A method of making Portland cement which comprises grinding cement clinker together with about 3.0% of gypsum, said gypsum being pretreated with 0.01% to 0.5%, based on the total charge to the grinder, of a grinding aid selected from the class consisting of naturally occurring naphthenic acid and metal salts of naturally occurring naphthenic acid.

8. A Portland cement prepared by grinding Portland cement clinker together with 0.5% to 5.0% of gypsum, said gypsum being pretreated by admixture therewith of a grinding aid selected from the class of compounds consisting of naturally occurring naphthenic acid and metal salts of naturally occurring naphthenic acid, said grinding aid amounting to between 0.01% and 0.5% of the total cement composition.

9. A method according to claim 1 in which said grinding aid is the calcium salt of naturally occurring naphthenic acid.

10. A method according to claim 1 in which said grinding aid is the sodium salt of naturally occurring naphthenic acid.

11. A method according to claim 1 in which said grinding aid is the magnesium salt of naturally occurring naphthenic acid.

HOOPER LINFORD.

REFERENCES CITED

The following references are of record in the file of this patent:

UNITED STATES PATENTS

| Number | Name | Date |
|---|---|---|
| 1,076,028 | Ellis | Oct. 21, 1913 |
| 2,003,656 | Starke | June 4, 1935 |
| 2,101,299 | Tyler | Dec. 7, 1937 |
| 2,337,671 | Linford | Dec. 28, 1943 |